US012205562B2

(12) United States Patent
Thompson

(10) Patent No.: US 12,205,562 B2
(45) Date of Patent: Jan. 21, 2025

(54) DRUM TUNING ASSEMBLY AND TUNABLE DRUM SYSTEM

(71) Applicant: Daniel Shane Thompson, North Augusta, SC (US)

(72) Inventor: Daniel Shane Thompson, North Augusta, SC (US)

( * ) Notice: Subject to any disclaimer, the term of this patent is extended or adjusted under 35 U.S.C. 154(b) by 204 days.

(21) Appl. No.: 18/095,668

(22) Filed: Jan. 11, 2023

(65) Prior Publication Data

US 2023/0230563 A1 Jul. 20, 2023

Related U.S. Application Data

(60) Provisional application No. 63/266,771, filed on Jan. 14, 2022.

(51) Int. Cl.

| | |
|---|---|
| ***G10D 3/16*** | (2020.01) |
| ***G10D 13/02*** | (2020.01) |
| ***G10D 13/16*** | (2020.01) |
| ***G10D 13/20*** | (2020.01) |
| ***G10D 13/22*** | (2020.01) |
| ***G10D 13/24*** | (2020.01) |

(52) U.S. Cl.

CPC ............. *G10D 13/16* (2020.02); *G10D 13/02* (2013.01); *G10D 13/20* (2020.02); *G10D 13/22* (2020.02); *G10D 13/24* (2020.02)

(58) Field of Classification Search

CPC ........ G10D 13/16; G10D 13/02; G10D 13/20; G10D 13/22; G10D 13/24; G10D 13/00

See application file for complete search history.

(56) References Cited

U.S. PATENT DOCUMENTS

| | | | | |
|---|---|---|---|---|
| 2,204,987 | A * | 6/1940 | Gussak .................. | G10D 13/16 84/412 |
| 2,729,133 | A | 1/1956 | Ludwig | |
| 3,701,834 | A | 10/1972 | Rubio | |
| 4,228,721 | A | 10/1980 | Hancox | |
| 4,570,526 | A | 2/1986 | Hoshino | |
| 4,583,442 | A | 4/1986 | Minor | |
| 5,392,681 | A | 2/1995 | Hall | |
| 5,610,350 | A | 3/1997 | Miller | |
| 5,739,448 | A | 4/1998 | Toscano | |
| 6,018,116 | A | 1/2000 | Simons et al. | |
| 6,441,286 | B1 | 8/2002 | Brando et al. | |
| 6,483,017 | B1 | 11/2002 | Dill et al. | |
| 6,747,199 | B2 | 6/2004 | Shah | |
| 6,812,392 | B2 | 11/2004 | Brando | |
| 6,949,702 | B2 | 9/2005 | Ortega et al. | |
| 7,034,216 | B2 | 4/2006 | DiPetro | |
| 7,045,696 | B2 | 5/2006 | Henry | |

(Continued)

*Primary Examiner* — Kimberly R Lockett

(74) *Attorney, Agent, or Firm* — Shumaker, Loop & Kendrick, LLP

(57) ABSTRACT

A tuning assembly and tunable drug system are described. The tuning assembly including a pressure ring, a rope ring with a first plurality of holes and a second plurality of holes, a rope system coupled to the first plurality of holes and a membrane of a drum head, and a plurality of fasteners engaging the second plurality of holes in the rope ring and a surface of the pressure ring. Tightening the plurality of fasteners increases the distance between the rope ring and the pressure ring causing the rope ring to pull the rope system and apply pressure to the membrane of the drum head.

13 Claims, 6 Drawing Sheets

(56) References Cited

U.S. PATENT DOCUMENTS

| | | | |
|---|---|---|---|
| 7,402,740 B2 | 7/2008 | van der Meulen | |
| 7,488,882 B2 | 2/2009 | Curet Troche | |
| 7,495,161 B1 | 2/2009 | Richards | |
| 7,777,112 B2 | 8/2010 | O'Connor | |
| 8,110,730 B2 | 2/2012 | Burdick | |
| 8,153,876 B2 | 4/2012 | Krishnamurthy | |
| 8,283,544 B2 | 10/2012 | Zuffante et al. | |
| 8,404,957 B2 | 3/2013 | Richards | |
| 8,809,656 B2 | 8/2014 | Radosevich | |
| 8,816,178 B2 | 8/2014 | Gelb | |
| 8,927,843 B2 | 1/2015 | Tashima et al. | |
| 8,962,962 B2 | 2/2015 | Jones | |
| 9,024,162 B2 | 5/2015 | Yovino | |
| 9,520,114 B2 | 12/2016 | Omoumi | |
| 9,613,602 B2 | 4/2017 | Welch et al. | |
| 10,269,334 B2 | 4/2019 | Spinazzola | |
| 10,665,213 B2 | 5/2020 | Sidell et al. | |
| 10,679,592 B2 | 6/2020 | Van Den Broeck | |
| 11,081,092 B2 | 8/2021 | Welch et al. | |
| 11,094,301 B2 | 8/2021 | Strickland | |
| 2006/0272478 A1 | 12/2006 | Steinhour et al. | |
| 2015/0379973 A1 | 12/2015 | Hegdahl | |
| 2021/0118415 A1 | 4/2021 | Bedson et al. | |
| 2022/0238086 A1* | 7/2022 | Bedson | G10D 13/16 |

* cited by examiner

DRUM TUNING ASSEMBLY AND TUNABLE DRUM SYSTEM

FIELD

The present invention relates to drums; and more particularly, to a system for turning a rope-tuned drum.

BACKGROUND OF THE INVENTION

Rope-tuned, or rope tension, drums require quite a bit of time and skill to tune. Tuning a rope-tuned drum can be a long and difficult process that involves an intricate weaving or braiding technique to tighten vertical ropes that apply tension to the drum head. Some drums include a mechanism for mechanically tuning the head of the drum using lugs and hardware at the top of the drum, near the head, to apply tension to tighten the head of the drum using a key or wrench. These mechanisms remove the vertical rope from the drum and create a less authentic appearance and experience for the drummer.

BRIEF SUMMARY

Embodiments of the present invention addresses the above needs and/or achieve other advantages by providing a drum tuning assembly and a tunable drum system.

In one aspect, the drum tuning assembly includes a pressure ring, a rope ring with a first plurality of holes and a second plurality of holes, a rope system couple to the rope ring by, the first plurality of holes and coupled to a membrane of a drum head, and a plurality of fasteners engaging the second plurality of holes and the pressure ring. Tightening the fasteners increases the distance between the rope ring and the pressure ring, causing the rope ring to pull the rope system applying pressure to the membrane on the drum head.

The rope system includes a plurality of bottom rope loops directly coupled to the first plurality of holes on the rope ring, a plurality of top rope loops coupled to the membrane by an upper membrane ring, and a tuning rope coupled to the plurality of bottom rope loops and coupled to the plurality of top rope loops.

In some embodiments, the pressure ring includes a plurality of pockets configured to receive the plurality of fasteners. Additionally, or alternatively, the diameter of the pressure ring is less than the diameter of the rope ring. In some embodiments, the width of the pressure ring is less than the width of the rope ring. In some embodiments, the pressure ring and the rope ring are steel.

In another aspect, a tunable drum system includes a shell which includes a tapered cylinder extending from a closed bottom and an open top, a base extending from the closed bottom of the shell, a membrane stretched over the open top of the shell, a pressure ring, a rope ring with a first plurality of holes and a second plurality of holes, a rope system couple to the rope ring by the first plurality of holes and coupled to a membrane of a drum head, and a plurality of fasteners engaging the second plurality of holes and engaging the surface of the pressure ring. Tightening the fasteners increases the distance between the rope ring and the pressure ring, causing the rope ring to pull the rope system applying pressure to the membrane on the drum head. In some embodiments, the membrane is held in place by an upper membrane ring and a lower membrane ring.

The rope system includes a plurality of bottom rope loops directly coupled to the first plurality of holes on the rope ring, a plurality of top rope loops coupled to the membrane by an upper membrane ring, and a tuning rope coupled to the plurality of bottom rope loops and coupled to the plurality of top rope loops.

In some embodiments, the shell and the base are made from a hard wood. In some embodiments, the shell and base are made from a single piece of hard wood. In some embodiments, the pressure ring includes a plurality of pockets configured to receive the plurality of fasteners. Additionally, or alternatively, the diameter of the pressure ring is less than the diameter of the rope ring. In some embodiments, the width of the pressure ring is less than the width of the rope ring. In some embodiments, the pressure ring and the rope ring are stainless steel.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

The drawings described herein are for illustrative purposes for selected embodiments and not all possible implementations, and are not intended to limit the scope of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The present invention is a mechanical tuning system located below and attached to a rope tuning system known in the art. The prevent invention helps mechanically tune a rope tuned drum. The tuning assembly and tunable drum system enable a person to quickly tune, and un-tune, a drum to avoid a fast temperature change resulting in the membrane head breaking, or to tune the drum to a desired tension for a performance.

The tuning assembly may use two rings that circle the drum, a pressure ring and a rope ring. The rope ring connects to the rope system that applies pressure to the drum head or membrane. The pressure ring connects to the rope ring and may increase or decrease the tightness of the rope system by adjusting its connection to the rope ring. The pressure ring may be above the rope ring. The rings may be connected by screws or a nut and bolt which also provide a distance or gap between the two rings.

A plurality of fasteners, such as screws, pull the rope ring closer or push the rope ring further away from the pressure ring. This mechanical function enables the drum to be tuned quickly while maintaining a maximum integrity of a rope tuned drum. The pressure ring may be threaded for the screws or have a slot for an adjustable nut to change the angle of the screw if necessary. The pressure ring may also have a pocket for securing the fastener, or screw.

Figure 1:
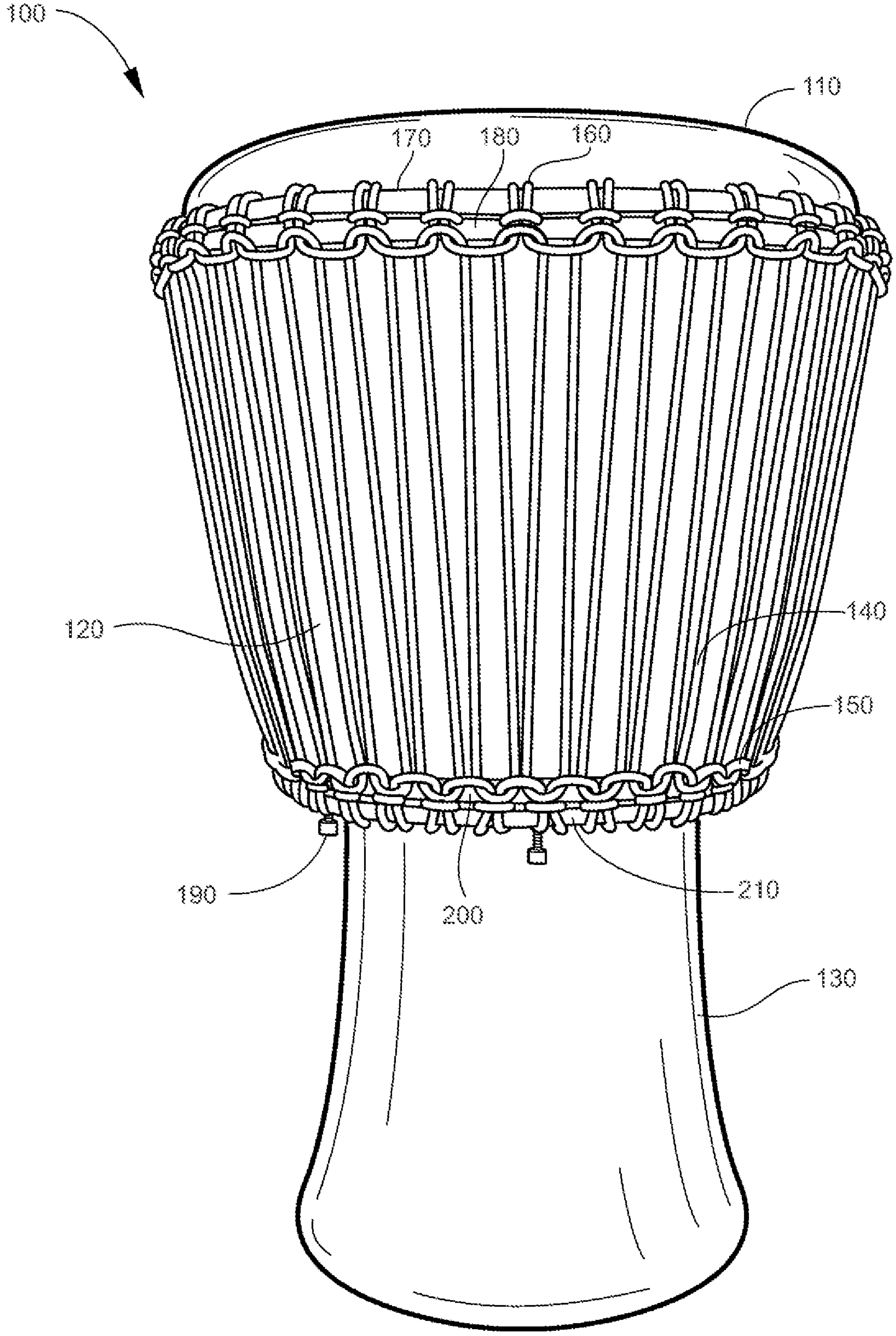
FIG. 1 is a perspective view of a tunable drum system in accordance with an embodiment of the present invention.
Figure 2:
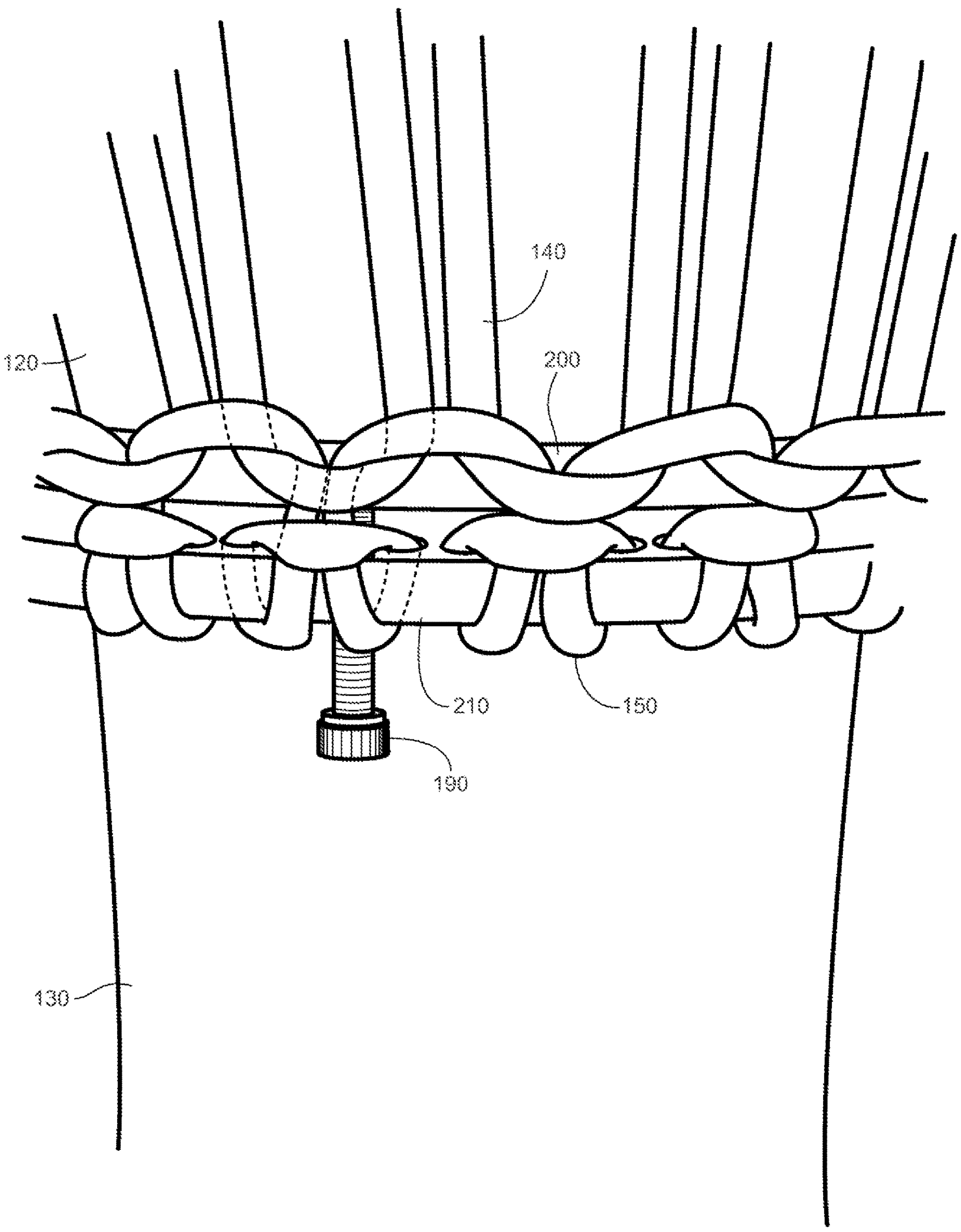
FIG. 2 is a partial view of a tuning assembly in accordance with an embodiment of the present invention.
Figure 3:
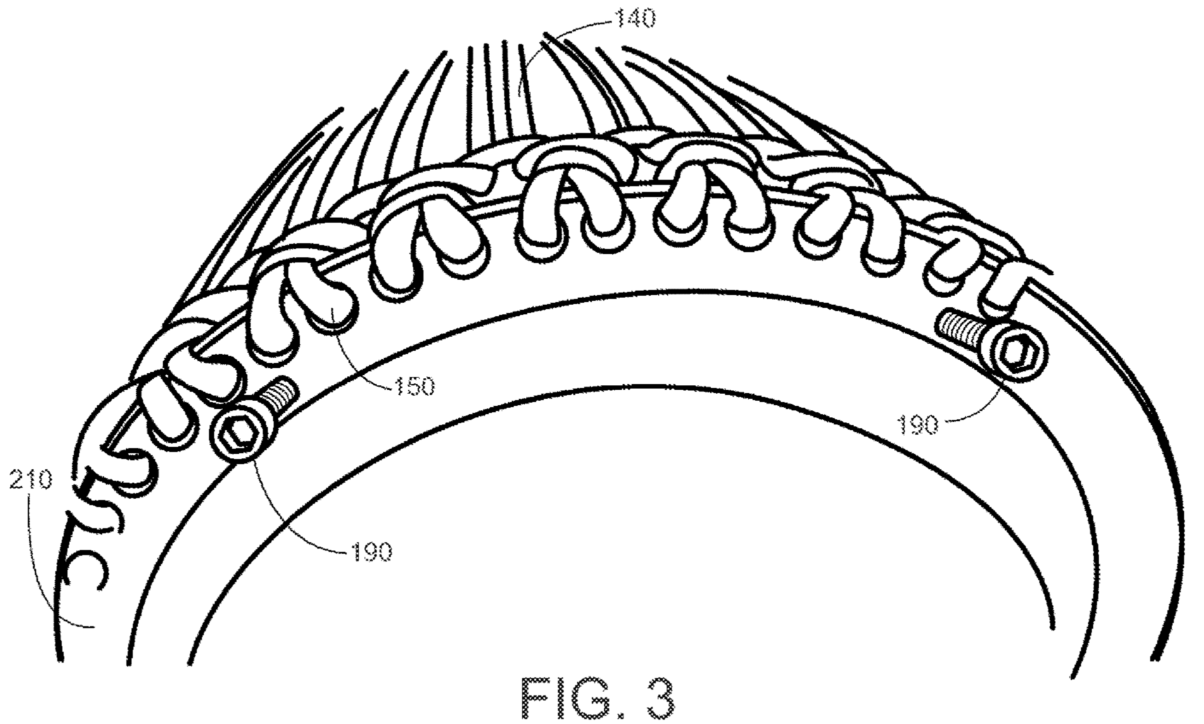
FIG. 3 is a partial view of a tuning assembly in accordance with an embodiment of the present invention.
Figure 4:
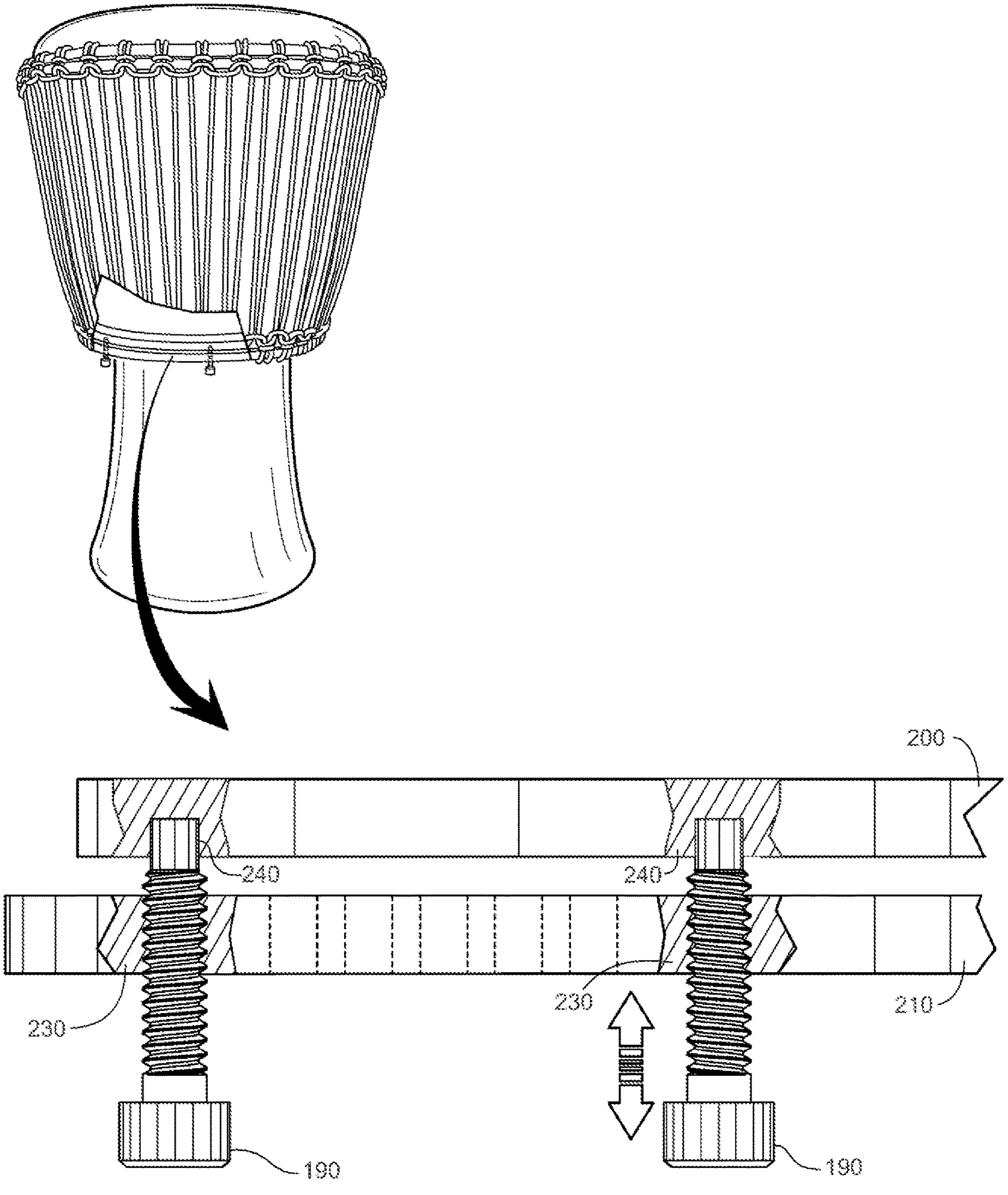
FIG. 4 is a sectional view of the rope ring, pressure ring, and fasteners of a tuning assembly in accordance with an embodiment of the present invention.

Referring to the FIG. 1, the tunable drum system 100 includes a shell 120. The shell is a hollow cylinder with a closed bottom and an open top. The tunable drum system 100 further includes a base 130 adjacent the closed bottom of the shell 120. The shell 120 and the base 130 may be made from a hard wood. In some embodiments, the shell 120 and the base 130 are made from a single piece of hard wood. Alternatively, the shell 120 and the base 130 may be produced from multiple wood staves. Additionally, or alternatively, the shell 120 and the base 130 are produced separately and grafted together. Often the shell 120 and the base 130 are carved to include intricate designs on the base 130. Alternatively, the shell 120 and the base 130 may be made from fiberglass, wood composite, metal, or polymeric material.

A membrane 110, sometimes referred to as a skin, is stretched over the open top of the shell 120. The membrane 110 is secured onto the open top of the shell 120 by ring system that includes an upper membrane ring 170 and a lower membrane ring 180. The ring system is known in the art for securing membranes, or skins, to drum heads. The membrane 110 may be an animal skin, such as goat, cow, or antelope. Alternatively, the membrane 110 may be a synthetic material, including but not limited to a polyethylene terephthalate (PET) such as biaxially-oriented PET commonly referred to as BoPET or Mylar®.

The tuning assembly is illustrated in FIGS. 1-7. The tuning assembly includes a pressure ring 200 and a rope ring 210. The pressure ring 200 and rope ring 210 are connected by a plurality of fasteners 190. When the plurality of fasteners 190 are turned in a first direction, or tightened, the pressure ring 200 and the rope ring 210 are forced apart, i.e. the distance between the pressure ring 200 and the rope ring 210 increases. Additionally, when the plurality of fasteners 190 are turned in a second direction, or loosened, the pressure ring 200 and the rope ring 210 are pulled closer together, i.e. the distance between the pressure ring 200 and the rope ring 10 decreases. The rope ring 210 includes a first plurality of holes 220 that couple the rope ring 210 to the rope system, and a second plurality of holes 230 that are engaged by the plurality of fasteners 190. The rope ring 210 and/or the pressure ring 200 may be made of steel, including stainless steel, nitrified steel, carbon steel, alloy steel, or tool steel. In some embodiments, the steel may be powder-coated. Additionally, or alternatively, the rope ring 210 and/or the pressure ring 200 may be made of a metal or metal alloy. Alternatively, the rope ring 210 and/or the pressure ring 200 may be made of a polymeric material. The rope ring 210 and the pressure ring 200 should be made out of a strong material to withstand the pressure from the plurality of fasteners 190 and the rope system.

The rope system includes a plurality of top rope loops 160 couple to the upper membrane ring 170 and a plurality of bottom rope loops 150 coupled to the rope holes 220 of the rope ring 210. A tuning rope 140 is weaved through each of the plurality of top rope loops 160 and each of the plurality of bottom rope loops 150. The tuning rope 140 is sometimes referred to as the verticals. In a traditionally tuned drum the verticals are woven together or braided to tighten and tune the membrane or skin of the drum. However, the present invention does not require weaving or braiding the verticals to tune the membrane or skin. When the plurality of fasteners 190 are tightened, the rope ring 210 is forced downward in relation to the pressure ring 200 resulting in an increased distance between the pressure ring 200 and the rope ring 210. When the rope ring 210 is forced downward it concertedly pulls the plurality of bottom rope loops 150 downward resulting in a pulling of the tuning rope 140, which pulls the plurality of top rope loops 160, which pulls the upper membrane ring 170 and tightens the membrane 110. Likewise, when the plurality of fasteners 190 are loosened, the rope ring 210 is pulled toward the pressure ring 200 decreasing the distance between the pressure ring 200 and the rope ring 210, this releases pressure from the rope system (the plurality of bottom rope loops 150, the tuning rope 140, and the plurality of top rope loops 160) resulting in less tension on the membrane 110.

Figure 5:
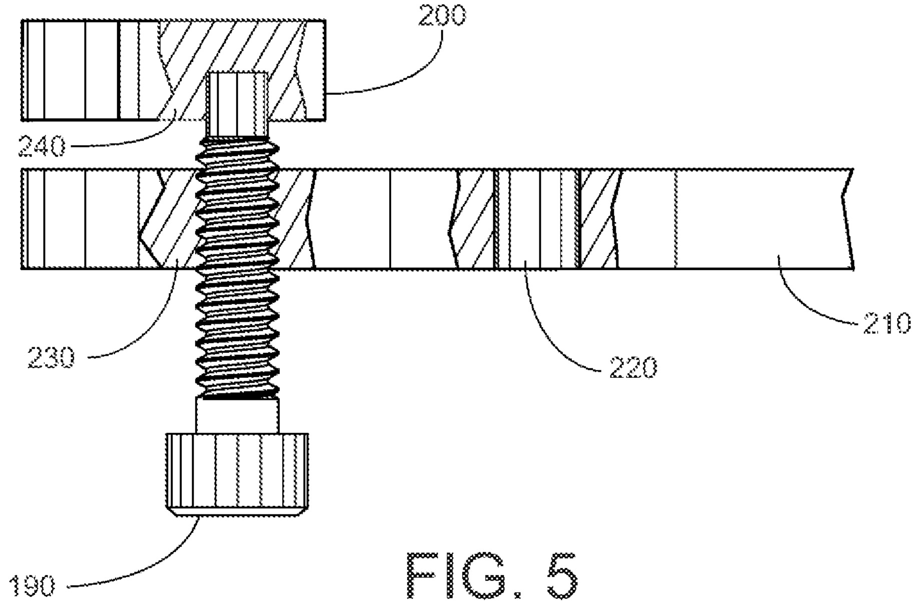
FIG. 5 is a sectional view of the rope ring, pressure ring, and fasteners of a tuning assembly in accordance with an embodiment of the present invention.
Figure 6:
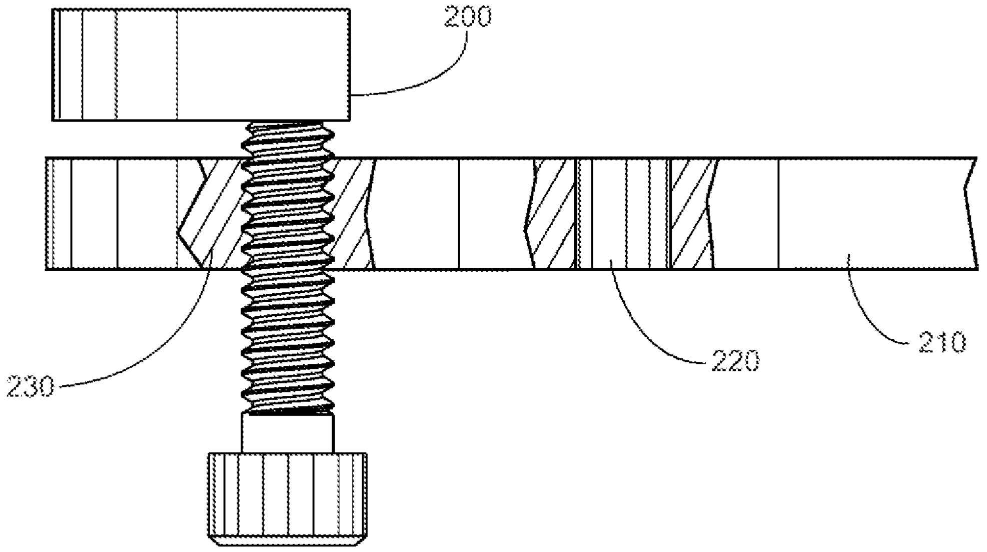
FIG. 6 is a sectional view of the rope ring, pressure ring, and fasteners of a tuning assembly in accordance with an embodiment of the present invention.

As shown in FIG. 5, the pressure ring 200 may include a plurality of pockets 240 to secure the plurality of fasteners 190. Alternatively, the pressure ring 200 may be absent the plurality of pockets, as shown in FIG. 6. In some embodiments, the plurality of pockets 240 may be threaded.

The number of the plurality of pockets 240 corresponds to the number of the second plurality of holes 230 and the number of the plurality of fasteners 190. The second plurality of holes 230 for engaging the plurality of fasteners 190 should be evenly spaced across the circumference of the drum 100 and rope ring 210. The exact number of the plurality of fasteners 190, and likewise the number of the second plurality of holes 230, will depend on the size of the drum. As an example, when the drum head is about thirteen inches to about fourteen inches in diameter, there are six fasteners and six corresponding holes in the rope ring. Likewise, in this example, if there are pockets in the pressure ring for securing the fasteners, there would be six pockets.

Figure 7:
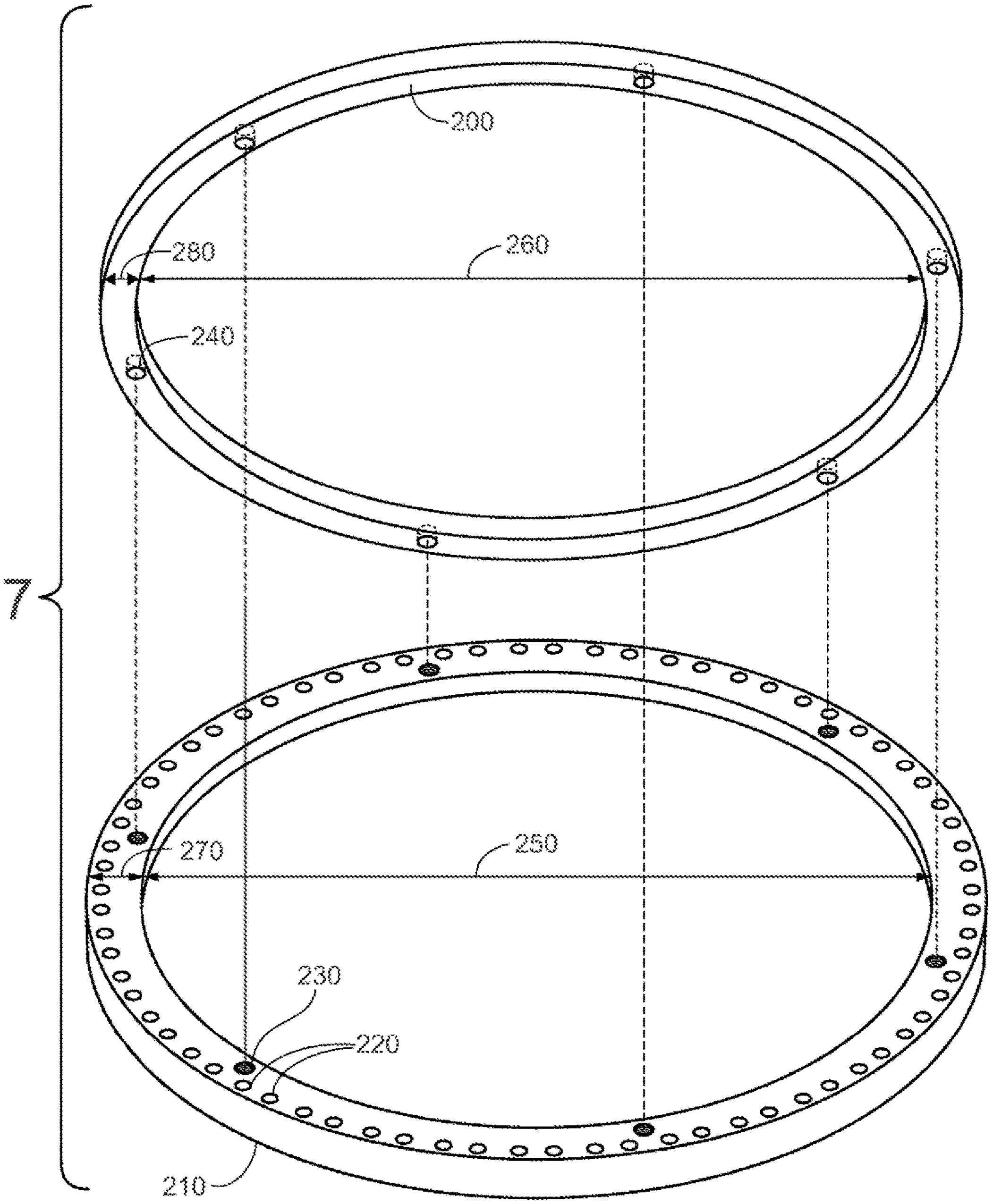
FIG. 7 is an exploded view of a tuning assembly in accordance with an embodiment of the present invention.

As shown in FIG. 7, the diameter of the rope ring 250 may be larger than the diameter of the pressure ring 260 such that the pressure ring 200 does not interfere with the tuning rope 140. Additionally, the width of the rope ring 270 may be larger than the width of the pressure ring 280 to allow for each of the first plurality of holes 220 and the second plurality of holes 230.

While the drawings and descriptions herein are directed to a djembe-style drum, the systems and methods described herein may be implemented on any rope tension drum including, but not limited to, a Tabla, an Ashiko, a Darbuka or a Doumbek.

It should be understood that the foregoing relates to exemplary embodiments of the invention and that modifications may be made without departing from the spirit and scope of the invention as set forth in the following claims.

What is claimed is:

1. A tuning assembly configured for tuning a drum, the system comprising a pressure ring;

a rope ring comprising a first plurality of holes and a second plurality of holes;

a rope system coupled to the rope ring by the first plurality of holes and coupled to a membrane of a drum head; and a plurality of fasteners engaging the second plurality of holes and engaging a surface of the pressure ring, wherein tightening the plurality of fasteners increases a distance between the rope ring and the pressure ring causing the rope ring to pull the rope system and apply pressure to the membrane;

wherein the rope systems comprises a plurality of bottom rope loops coupled directly to the first plurality of holes, a plurality of top rope loops coupled to the membrane by an upper membrane ring, and a tuning rope coupled to the plurality of bottom rope loops and coupled to the plurality of top rope loops; and wherein the pressure ring comprise a plurality of pockets configured to receive the plurality of fasteners.

2. The tuning assembly of claim 1, wherein a diameter of the pressure ring is less than a diameter of the rope ring.

3. The tuning assembly of claim 2, wherein a width of the pressure ring is less than a width of the rope ring.

4. The tuning assembly of claim 3, wherein the pressure ring and the rope ring are comprised of steel.

5. A tunable drum system, the system comprising:

a shell, the shell comprising a hollow tapered cylinder extending from a closed bottom and an open top;

a base extending from the closed bottom of the shell;

a membrane stretched over the open top of the shell;

a pressure ring;

a rope ring comprising a first plurality of holes and a second plurality of holes;

a rope system coupled to the rope ring by the first plurality of holes and coupled to a membrane of a drum head; and a plurality of fasteners engaging the second plurality of holes and engaging a surface of the pressure ring, wherein tightening the plurality of fasteners increases a distance between the rope ring and the pressure ring causing the rope ring to pull the rope system and apply pressure to the membrane.

6. The tunable drum of claim 5, wherein the membrane is held in place by an upper membrane ring and a lower membrane ring.

7. The tunable drum of claim 6, wherein the rope system comprises a plurality of bottom rope loops coupled directly to the first plurality of holes;

a plurality of top rope loops coupled to the membrane by the upper membrane ring, and a tuning rope coupled to the plurality of bottom rope loops and coupled to the plurality of top rope loops.

8. The tunable drum of claim 7, wherein the pressure ring comprises a plurality of pockets configured to receive the fastener.

9. The tunable drum of claim 8, wherein a diameter of the pressure ring is less than a diameter of the rope ring.

10. The tunable drum of claim 9, wherein a width of the pressure ring is less than a width of the rope ring.

11. The tunable drum of claim 10, wherein the pressure ring and the rope ring are comprised of steel.

12. The tunable drum of claim 11, wherein the shell and the base are comprised of a hard wood.

13. The tunable drum of claim 12, wherein the shell and the base are comprised of a single piece of hard wood.

* * * * *